United States Patent
Nakano

(10) Patent No.: US 9,674,484 B2
(45) Date of Patent: Jun. 6, 2017

(54) IMAGE PROCESSING DEVICE AND IMAGE PROCESSING METHOD

(71) Applicant: SAMSUNG DISPLAY CO., LTD., Yongin-si, Gyeonggi-do (KR)

(72) Inventor: Takashi Nakano, Yokohama (JP)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 36 days.

(21) Appl. No.: 14/924,321

(22) Filed: Oct. 27, 2015

(65) Prior Publication Data

US 2016/0119578 A1   Apr. 28, 2016

(30) Foreign Application Priority Data

Oct. 27, 2014  (JP) ................................ 2014-218522

(51) Int. Cl.
| | |
|---|---|
| G06K 9/32 | (2006.01) |
| H04N 7/01 | (2006.01) |
| G06T 3/40 | (2006.01) |
| G06T 5/00 | (2006.01) |
| G06T 5/20 | (2006.01) |

(52) U.S. Cl.
CPC ......... H04N 7/0142 (2013.01); G06T 3/4007 (2013.01); G06T 5/002 (2013.01); G06T 5/20 (2013.01); *G06T 2207/10024* (2013.01); *G06T 2207/20192* (2013.01)

(58) Field of Classification Search
None
See application file for complete search history.

(56) References Cited

U.S. PATENT DOCUMENTS

| | | | |
|---|---|---|---|
| 6,771,835 B2 * | 8/2004 | Han | G06T 3/403 382/199 |
| 6,782,143 B1 * | 8/2004 | Dube | G06T 3/403 324/309 |
| 7,245,326 B2 * | 7/2007 | Orlick | H04N 7/012 348/441 |
| 7,324,709 B1 * | 1/2008 | Wang | G06T 3/4007 348/448 |

(Continued)

FOREIGN PATENT DOCUMENTS

| | | |
|---|---|---|
| EP | 1345432 | 6/2012 |
| JP | H09252401 | 9/1997 |

(Continued)

OTHER PUBLICATIONS

Zhou et al., "Image zooming using directional cubic convolution interpolation", IET Journal of Image Processing, Aug. 2012, vol. 6, issue. 6, pp. 627-634.*

*Primary Examiner* — Feng Niu
(74) *Attorney, Agent, or Firm* — F. Chau & Associates, LLC

(57) ABSTRACT

An image processing device and method can perform interpolation that reduces overshoot and ringing on a step edge while maintaining high frequency components. The image processing device includes a vertical step edge area determination unit that determines a vertical step edge area of an image, a horizontal step edge area determination unit that determines a horizontal step edge area of the image, and an interpolation unit that performs an interpolation based on the vertical step edge area and the horizontal step edge area.

18 Claims, 7 Drawing Sheets

(56) References Cited

U.S. PATENT DOCUMENTS

| | | | |
|---|---|---|---|
| 7,764,839 B2 | 7/2010 | Abe | |
| 8,175,417 B2 * | 5/2012 | Yamada | G06T 3/4007 358/525 |
| 8,760,531 B2 * | 6/2014 | Taniguchi | H04N 9/045 348/222.1 |
| 8,983,204 B2 * | 3/2015 | Kitajima | G06K 9/4604 382/199 |
| 2003/0038817 A1 * | 2/2003 | Kawamura | G06T 3/4007 345/606 |
| 2010/0098334 A1 * | 4/2010 | Fukutomi | H04N 9/045 382/167 |

FOREIGN PATENT DOCUMENTS

| | | |
|---|---|---|
| JP | 2001189850 | 7/2001 |
| JP | 2005107437 | 4/2005 |
| JP | 2008282187 | 11/2008 |
| JP | 2010009381 | 1/2010 |
| JP | 2013115751 | 6/2013 |

* cited by examiner

IMAGE PROCESSING DEVICE AND IMAGE PROCESSING METHOD

CROSS-REFERENCE TO RELATED APPLICATIONS

This U.S. non-provisional patent application claims priority under 35 U.S.C. §119 from, and the benefit of, Japanese Patent Application No. 2014-218522, filed on Oct. 27, 2014, the contents of which are herein incorporated by reference in their entirety.

BACKGROUND

1. Technical Field

Embodiments of the present disclosure herein are directed to an image processing device and an image processing method.

2. Discussion of the Related Art

Recently, with the introduction of higher precision display devices such as television receivers, the importance of image interpolation is increasing. Accordingly, technologies for interpolation are being developed.

For example, overshoot may be restrained by performing the interpolation based on a detected result of an area where the overshoot occurs. However, if the area where the overshoot occurs is detected based on characteristics of one pixel, the detection of the area may be insufficient.

SUMMARY

Embodiments of the present disclosure provides an image processing device and method that can perform interpolation for reducing overshoot and ringing on a step edge while maintaining a high frequency component, such as a texture.

An embodiment of the inventive concept provides an image processing device that includes: a vertical step edge area determination unit that determines a vertical step edge area of an image; a horizontal step edge area determination unit that determines a horizontal step edge area; and an interpolation unit that performs an interpolation on the vertical step edge area and the horizontal step edge area, wherein the vertical step edge area determination unit calculates an absolute value of a difference between a vertical interpolation value of a target pixel and a value of a pixel vertically adjacent to the target pixel and determines the vertical step edge area based on a relationship between a maximum value and a minimum value of the absolute value of an upper peripheral pixel with respect to the target pixel and the maximum value and the minimum value of the absolute value of a lower peripheral pixel with respect to the target pixel.

In an embodiment, the horizontal step edge area determination unit calculates an absolute value of a difference between a horizontal interpolation value of a target pixel and a value of a pixel horizontally adjacent to the target pixel and determines the horizontal step edge area based on a relationship between the maximum value and the minimum value of the absolute value of a left peripheral pixel with respect to the target pixel and the maximum value and the minimum value of the absolute value of a right peripheral pixel with respect to the target pixel.

In an embodiment, the interpolation unit may perform a vertical interpolation using a result of a first interpolation in which overshoot and ringing do not occur or a result of a second interpolation different from the first interpolation based on the vertical step edge area and performs a horizontal interpolation using the result of the first interpolation or the result of the second interpolation based on the horizontal step edge area.

In an embodiment, the image processing device may further include: a first combination ratio calculation unit that calculates a first combination ratio that combines a result of a first vertical interpolation in which overshoot and ringing do not occur with a result of a second interpolation different from the first vertical interpolation based on the vertical step edge area; and a second combination ratio calculation unit that calculates a second combination ratio that combine a result of a first horizontal interpolation with a result of the second interpolation based on the horizontal step edge area, wherein the interpolation unit may combine the result of the first vertical interpolation with the result of the second interpolation based on the first combination ratio to perform vertical interpolation, and may combine the result of the first horizontal interpolation with the result of the second interpolation based on on the second combination ratio to perform horizontal interpolation.

In an embodiment, the vertical step edge area determination unit may calculate a vertical interpolation value of the target pixel by the first vertical interpolation in which overshoot and ringing do not occur.

In an embodiment, the horizontal step edge area determination unit may calculate a horizontal interpolation value of the target pixel by the first horizontal interpolation in which overshoot and ringing do not occur.

In an embodiment of the inventive concept, an image processing method includes: determining a vertical step edge area of an image; determining a horizontal step edge area of the image; and performing an interpolation based on the vertical step edge area and the horizontal step edge area, wherein determining the vertical step edge area includes calculating an absolute value of a difference between a vertical interpolation value of a target pixel and a value of a pixel vertically adjacent to the target pixel, and determining the vertical step edge area based on a relationship between a maximum value and a minimum value of the absolute value of an upper peripheral pixel with respect to the target pixel and the maximum value and the minimum value of the absolute value of a lower peripheral pixel with respect to the target pixel.

In an embodiment, determining the horizontal step edge area includes calculating an absolute value of a difference between a horizontal interpolation value of a target pixel and a value of a pixel horizontally adjacent to the target pixel, and determining the horizontal step edge area based on a relationship between the maximum value and the minimum value of the absolute value of a left peripheral pixel with respect to the target pixel and the maximum value and the minimum value of the absolute value of a right peripheral pixel with respect to the target pixel.

In an embodiment, the method may further include performing a vertical interpolation using a result of a first interpolation in which overshoot and ringing do not occur or a result of a second interpolation different from the first interpolation based on the vertical step edge area, and performing a horizontal interpolation using the result of the first interpolation or the result of the second interpolation based on the horizontal step edge area.

In an embodiment, the method may further include calculating a first combination ratio that combines a result of a first vertical interpolation in which overshoot and ringing do not occur with a result of a second interpolation different from the first interpolation based on the vertical step edge area; and calculating a second combination ratio that combines a result of the first horizontal interpolation with a result of the second interpolation based on the horizontal step edge area, wherein the result of the first vertical interpolation is combined with the result of the second interpolation on the basis of the first combination ratio to perform vertical interpolation, and the result of the first horizontal interpolation is combined with the result of the second interpolation on the basis of the second combination ratio to perform horizontal interpolation.

In an embodiment, determining the vertical step edge area includes calculating a vertical interpolation value of the target pixel by the first vertical interpolation in which overshoot and ringing do not occur.

In an embodiment, determining the horizontal step edge area includes calculating a horizontal interpolation value of the target pixel by the first horizontal interpolation in which overshoot and ringing do not occur.

In an embodiment of the inventive concept, an image processing device includes: a vertical step edge area determination unit that determines a vertical step edge area of an image; a horizontal step edge area determination unit that determines a horizontal step edge area of the image; and an interpolation unit that performs an interpolation on a the vertical step edge area and the horizontal step edge area, wherein the interpolation unit performs a vertical interpolation using a result of a first interpolation in which overshoot and ringing do not occur or a result of a second interpolation different from the first interpolation based on the vertical step edge area, and performs a horizontal interpolation using the result of the first interpolation or the result of the second interpolation based on the horizontal step edge area.

In an embodiment, the horizontal step edge area determination unit calculates an absolute value of a difference between a horizontal interpolation value of a target pixel and a value of a pixel horizontally adjacent to the target pixel and determines the horizontal step edge area based on a relationship between the maximum value and the minimum value of the absolute value of a left peripheral pixel with respect to the target pixel and the maximum value and the minimum value of the absolute value of a right peripheral pixel with respect to the target pixel.

In an embodiment, the vertical step edge area determination unit calculates an absolute value of a difference between a vertical interpolation value of a target pixel and a value of a pixel vertically adjacent to the target pixel and determines the vertical step edge area based on a relationship between a maximum value and a minimum value of the absolute value of an upper peripheral pixel with respect to the target pixel and the maximum value and the minimum value of the absolute value of a lower peripheral pixel with respect to the target pixel.

In an embodiment, the image processing device may further include: a first combination part that calculates a first combination ratio that combines a result of a first vertical interpolation in which overshoot and ringing do not occur with a result of a second interpolation different from the first interpolation based on the vertical step edge area; and a second combination part that calculates a second combination ratio that combines a result of the first horizontal interpolation with a result of the second interpolation based on the horizontal step edge area, wherein the interpolation unit combines the result of the first vertical interpolation with the result of the second interpolation on the basis of the first combination ratio to perform vertical interpolation, and combines the result of the first horizontal interpolation with the result of the second interpolation on the basis of the second combination ratio to perform horizontal interpolation.

In an embodiment, the vertical step edge area determination unit calculates a vertical interpolation value of the target pixel by the first vertical interpolation in which overshoot and ringing do not occur.

In an embodiment, the horizontal step edge area determination unit calculates a horizontal interpolation value of the target pixel by the first horizontal interpolation in which overshoot and ringing do not occur.

DETAILED DESCRIPTION

Figure 1:
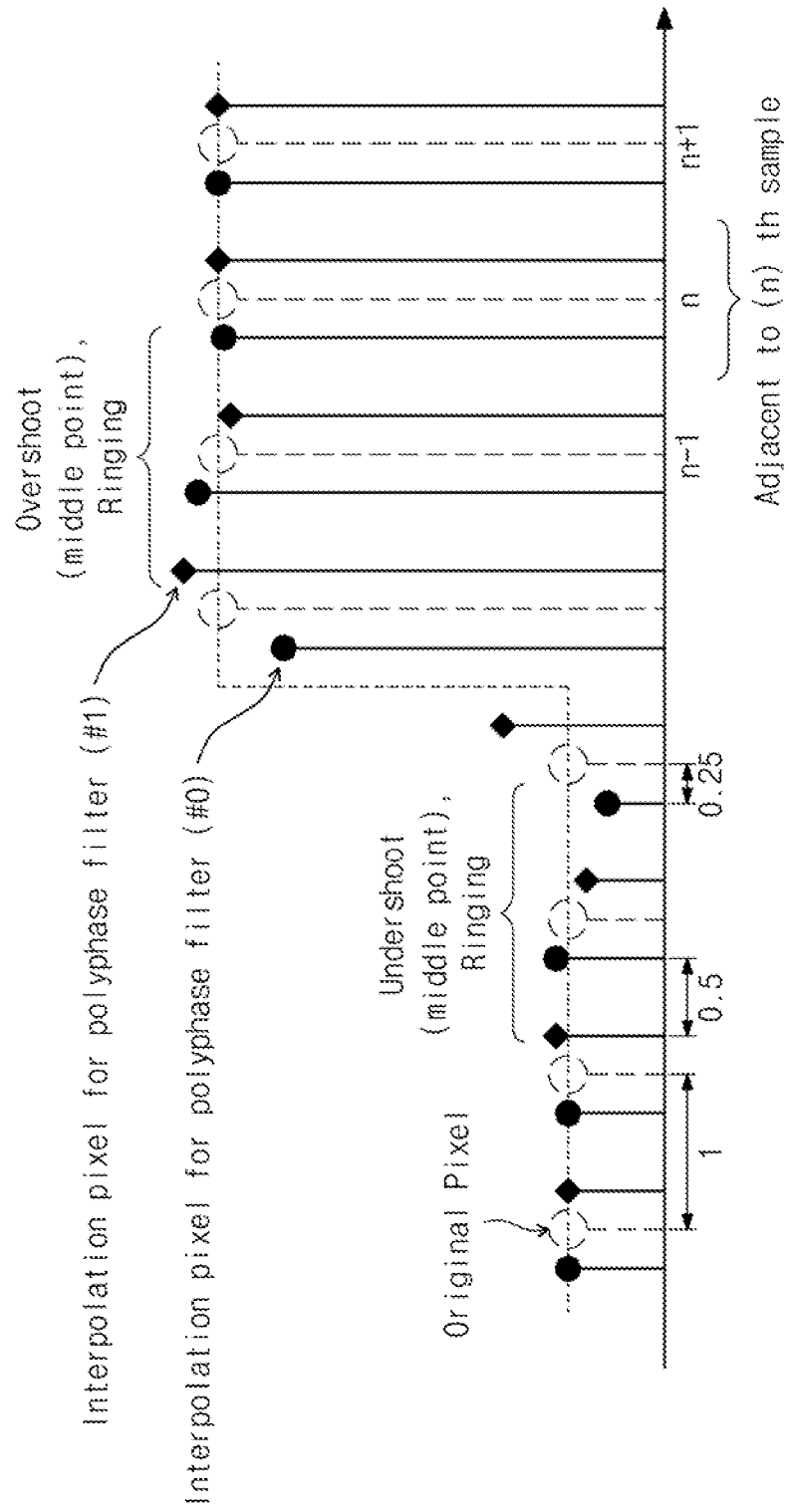
FIG. 1 illustrates an image processing method according to an embodiment of the inventive concept.

Hereinafter, embodiments of the inventive concept will be described in detail with reference to the accompanying drawings. In the drawings, like reference numerals may be used to refer to the same or similar elements.

Image Processing Method According to an Embodiment of the Inventive Concept

Hereinafter, an image processing method performed by an image processing device according to an embodiment of the inventive concept will be exemplary described.

[1] Summary of an Image Processing Method According to an Embodiment of the Inventive Concept For example, when a one-dimensional signal is magnified U times, where U is a positive integer, an interpolation result or value is obtained by calculation on an interpolation position by a polyphase filter obtained by dividing an anti-aliasing filter into U filters. Here, a polyphase filter has a structure in which multiplication to zero interpolated by an up-sampler is skipped.

Letting a sampling interval of an original image signal be 1, and an arbitrary position $x(n-0.5 \leq x < n+0.5)$ adjacent to an nth sample, where n is an integer, be defined as an interpolation position, a sign of a coefficient of the polyphase filter for the nth sample is "sgn(sinc(n−x))".

Here, when a linear interpolation is applied as the anti-aliasing filter, the polyphase filter may be a two-tap filter that receives, as an input, two samples, i.e., (n−1)th and nth samples for the case where x<n, or nth and (n+1)th samples for the case where x>n, where the polyphase filter always has a positive coefficient. In this case, an overshoot, including a so-called undershoot, and ringing do not occur.

When a cubic interpolation or a 2-lobbed Lanczos (hereinafter, referred to as "Lanczos2") or 3-lobbed Lanczos (hereinafter, referred to as "Lanczos3") filter is applied, if x<n, a coefficient for an (n−2)th and (n+1)th sample is negative, and if x>n, a coefficient for an (n−1)th and (n+2)th sample may be negative. When the image is enlarged, it may be processed within six taps to restrain ringing or other effects of a relatively far edge. Even if the tap number is high, a weighting of a coefficient for a pixel spaced apart from the interpolation position may decrease. Thus, only the negative coefficient for a pixel close to the interpolation position may be considered as a main factor of the overshoot and ringing.

FIG. 1 illustrates an image processing method according to an embodiment of the inventive concept. FIG. 1 illustrates an example of a waveform obtained when a step edge area is double interpolated using a Lanczos 3 filter. For example, as illustrated in FIG. 1, an edge with an adjacent flat area corresponds to the "step edge area".

In the example of FIG. 1, the interpolation positions are n−0.25 and n+0.25, and each of the interpolation positions are interpolated on the basis of a #0 polyphase filter and a #1 polyphase filter. A #0 polyphase filter may have coefficients of about 0.0074, about −0.0680, about 0.2710, about 0.8928, about −0.1333, and about 0.0301 respectively for an (n−3)th sample to the (n+2)th sample. A #1 polyphase filter may have coefficients of about 0.0301, about −0.1333, about 0.8928, about 0.2710, about −0.0680, and about 0.0074 respectively for the (n−2)th sample to an (n+3)th sample.

For example, as illustrated in FIG. 1, when a cubic interpolation or a Lanczos filter interpolation is performed on the step edge area, an area around the edge, such as an area corresponding to two original pixels adjacent to a boundary of the edge, has a value that significantly deviates from the waveform of the image signal.

Thus, when an interpolation other than a cubic interpolation or Lanczos interpolation is performed on the step edge area in which overshoot and ringing do not occur, the overshoot and ringing may decrease at an step edge. In addition, cubic interpolation or Lanczos interpolation may be performed on an area except for the step edge area so that an original high frequency component is less attenuated.

Here, an image processing device according to an embodiment of the inventive concept determines the step edge area from an input image signal, and performs interpolation corresponding to the step edge area.

Here, for example, an image displayed by the input image signal processed by an image processing device according to an embodiment of the inventive concept may be read from a recording medium included in an image processing device according to an embodiment of the inventive concept or an external recording medium connected to an image processing device according to an embodiment of the inventive concept. In addition, for example, an image displayed by the input image signal processed by an image processing device according to an embodiment of the inventive concept may be an image received from an external device by a communication device included in or connected to an image processing device according to an embodiment of the inventive concept.

In detail, an image processing device according to an embodiment of the inventive concept can independently determine a vertical step edge area from the input image signal and determine a horizontal step edge area from the input image signal.

Here, a vertical step edge area according to an embodiment of the inventive concept is an area that represents a vertical step edge in the image displayed by the input image signal, and the horizontal step edge area according to an embodiment of the inventive concept is an area that represents a horizontal step edge in the image displayed by the input image signal.

An example of each of a vertical step edge area determination and a horizontal step edge area determination according to an embodiment of the inventive concept will be described below.

When the vertical and horizontal step edge areas are determined, an image processing device according to an embodiment of the inventive concept performs an interpolation corresponding to the vertical step edge area and the horizontal step edge area.

Here, for example, an interpolation according to an embodiment of the inventive concept may be "a first interpolation in which overshoot and ringing do not occur", "a second interpolation different from the first interpolation", or "a combination of a first interpolation and a second interpolation".

For example, a first interpolation according to an embodiment of the inventive concept may be linear interpolation. However, a first according to an embodiment of the inventive concept is not limited to linear interpolation and may be any interpolation in which overshoot and ringing do not occur.

In addition, a second interpolation according to an embodiment of the inventive concept may be an interpolation, such as a Lanczos2, a Lanczos3, or cubic interpolation, in which, although ringing may occur, the original high frequency component is less reduced. However, a second interpolation according to an embodiment of the inventive concept is not limited thereto. For example, the second interpolation according to an embodiment of the inventive concept may be any interpolation that differs from the first interpolation.

In addition, for example, the combination of the first interpolation and the second interpolation according to an embodiment of the inventive concept may combine the result of the first interpolation with the result of the second interpolation.

An image processing device according to an embodiment of the inventive concept performs an interpolation in the vertical direction of the image through an interpolation corresponding to a vertical step edge area. In addition, an image processing device according to an embodiment of the inventive concept performs an interpolation in the horizontal direction of the image through an interpolation corresponding to a horizontal step edge area. An example of an interpolation according to an embodiment of the inventive concept will be described below.

According to an embodiment of the inventive concept, an image processing device performs a vertical step edge area determination, a horizontal step edge area determination, and an interpolation according to an image processing method according to an embodiment of the inventive concept.

[2] Processing According to an Image Processing Method According to an Embodiment of the Inventive Concept Hereinafter, a processing according to an image processing method according to an embodiment of the inventive concept will be described in more detail.

(1) Vertical Step Edge Area Determination and Horizontal Step Edge Area Determination First, a vertical step edge area determination and a horizontal step edge area determination will be described.

The vertical step edge area determination determines whether the area is a step edge area when a vertical interpolation is performed. The horizontal step edge area determination determines whether the area is a step edge area when a horizontal interpolation is performed. Since the vertical step edge area determination and the horizontal step edge area determination are one-dimensional and mutually independent from each other, hereinafter, the vertical step edge area determination will be described. The horizontal step edge area determination can be performed by permuting the vertical direction of the vertical step edge area determination to the horizontal direction.

Figure 2:
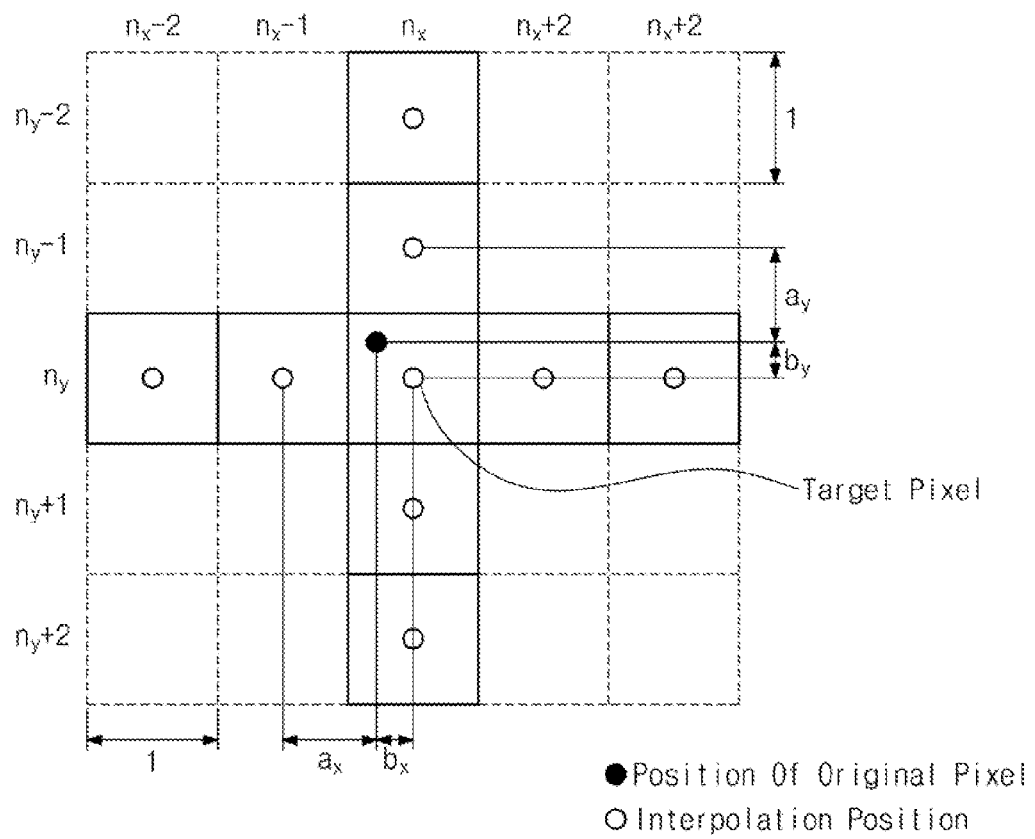
FIG. 2 illustrates an example of vertical step edge area determination according to an image processing method according to an embodiment of the inventive concept.

FIG. 2 illustrates an example of vertical step edge area determination according to an image processing method according to an embodiment of the inventive concept. FIG. 2 illustrates a 5×5 pixels area using a target pixel as a center.

For example, an image processing device according to an embodiment of the inventive concept calculates an interpolation value in the vertical direction with respect to the target pixel of FIG. 2. For example, an image processing device according to an embodiment of the inventive concept calculates a vertical direction interpolation value by a first interpolation, such as linear interpolation.

For example, when a vertical direction interpolation value is found by linear interpolation, an image processing device according to an embodiment of the inventive concept calculates an interpolation value C by an equation 1 below. Here, $S(n_x, n_y)$ in Equation 1 is a sample value of the target pixel at a position $(n_x, n_y)$, and $S(n_x, n_y-1)$ in Equation 1 is a sample value of a pixel at a position $(n_x, n_y-1)$. A sample value according to an embodiment of the inventive concept may be a luminance value. Hereinafter, the sample value is referred to as a "pixel value".

$$C = a_y \cdot S(n_x, n_y) + b_y \cdot S(n_x, n_y - 1), a_y + b_y = 1 \quad \text{[Equation 1]}$$

In addition, when the interpolation position is between the pixel at position $(n_x, n_y)$ and the pixel at position $(n_x, n_y-1)$, the interpolation value C is calculated by using the sample value of the pixel at position $(n_x, n_y-1)$ as in Equation 1.

An image processing device according to an embodiment of the inventive concept can calculate "an absolute value of difference between the vertical direction interpolation value C of the target pixel and a pixel value of a vertical pixel peripheral to the target pixel, hereinafter, referred to as an "differential absolute value"," by using Equation 2 below.

Here, DU in Equation 2 below represents a differential absolute value corresponding to peripheral pixels at an upper side with respect to the target pixel. Also, DL in Equation 2 below represents a differential absolute value corresponding to peripheral pixels at a lower side with respect to the target pixel. Hereinafter, the peripheral pixels at the upper side with respect to the target pixel are referred to as "upper peripheral pixels", and the peripheral pixels at the lower side with respect to the target pixel are referred to as "lower peripheral pixels".

Note that although FIG. 2, shows that there are two upper peripheral pixels with respect to the target pixel in the vertical direction and two lower peripheral pixels with respect to the target pixel, and an differential absolute value of the four pixels is calculated, the number of peripheral pixels with respect to the target pixel in the vertical direction according to embodiments of the inventive concept is not limited thereto. For example, according to embodiments of the inventive concept, there may be two or more upper peripheral pixels in the vertical direction, and there may be two or more lower peripheral pixels.

[Equation 2]

$$\begin{cases} DU_1 = |C - S(n_x, n_y - 1)| \\ DU_2 = |C - S(n_x, n_y - 2)| \\ DL_1 = |C - S(n_x, n_y + 1)| \\ DL_2 = |C - S(n_x, n_y + 2)| \end{cases} \quad \text{(Equation 2)}$$

In addition, as shown in Equation 3, an image processing device according to an embodiment of the inventive concept calculates a maximum value (DUmax) and a minimum value (DLmin) of the differential absolute value corresponding to the upper peripheral pixels, and a maximum value (DLmax) and a minimum value (DLmin) of the differential absolute value corresponding to the lower peripheral pixels.

[Equation 3]

$$\begin{cases} DU_{max} = \max(DU_1, DU_2) \\ DU_{min} = \min(DU_1, DU_2) \\ DL_{max} = \max(DL_1, DL_2) \\ DL_{min} = \min(DL_1, DL_2) \end{cases} \quad \text{(Equation 3)}$$

Here, if the maximum value (DUmax)>maximum value (DLmax), then the maximum edge is at the upper side of the interpolation position. If the maximum value (DUmax)<the maximum value (DLmax), then the maximum edge is at the lower side of the interpolation position. In addition, when a predetermined side and a side opposite thereto of the maximum edge are flat, the edge is determined to be a step edge.

Thus, an image processing device according to an embodiment of the inventive concept can determine the vertical step edge area from the relationships between the maximum value (DUmax) and the minimum value (DUmin) of the differential absolute value of the upper peripheral pixels, and the maximum value (DLmax) and the minimum value (DLmin) of the differential absolute value of the lower peripheral pixels.

In more detail, an image processing device according to an embodiment of the inventive concept can determine the vertical step edge area based on the standards of cases (a) to (c) below.

(a) the Maximum Value (DUmax)>the Maximum Value (DLmax)

An image processing device according to an embodiment of the inventive concept determines the step edge area when "DUmax/DLmax>α" is satisfied. Here, "α" is a reference value for determination. The reference value (α) may be experimentally obtained by using an image that includes the step edge. However, the reference value (α) is not limited to the above-described method and may be set according to other methods.

(b) the Maximum Value (DUmax)<the Maximum Value (DLmax)

An image processing device according to an embodiment of the inventive concept determines the step edge area when "DLmax/DUmax>α" is satisfied.

(c) the Maximum Value (DUmax)=the Maximum Value (DLmax)

An image processing device according to an embodiment of the inventive concept determines the step edge area when "DUmin/DLmin=1" is satisfied.

In addition, an image processing device according to an embodiment of the inventive concept can determine the step edge area when the conditions "DUmin<β, and DLmin<β"

is satisfied with respect to the "min" term. Here, "β" is a reference value used to prevent a non-edge part of an image from being smoothed, and may be small compared to the reference value α. The reference value (β) may be experimentally obtained by using an image that includes the step edge. However, the reference value (β) is not limited to the above-described method and may be set according to other methods.

An image processing device according to an embodiment of the inventive concept can perform the above described steps as the vertical step edge area determination to determine the vertical step edge area.

The same processing as described above for the vertical step edge area determination can be applied in the horizontal direction of the image to determine the horizontal step edge area. That is, in an image processing device according to an embodiment of the inventive concept, to perform a horizontal step edge area determination, the same processing as the described above for the vertical step edge area determination is performed on the image in the horizontal direction.

(2) Interpolation

An image processing device according to an embodiment of the inventive concept performs an interpolation that corresponds to the vertical step edge area and the horizontal step edge area.

An image processing device according to an embodiment of the inventive concept performs vertical interpolation in the image using the vertical step edge area. In addition, an image processing device according to an embodiment of the inventive concept performs horizontal interpolation in the image using the horizontal step edge area.

An image processing device according to an embodiment of the inventive concept can perform vertical interpolation in the image and then horizontal interpolation in the image. However, an image processing device according to an embodiment of the inventive concept can perform horizontal interpolation in the image and then vertical interpolation in the image. Hereinafter, an image processing device according to an embodiment of the inventive concept will be described as performing vertical interpolation in the image and then horizontal interpolation in the image.

(2-1) An Example of Interpolation: Interpolation According to Selection of a Result of the First Interpolation or a Result of Second Interpolation.

An image processing device according to an embodiment of the inventive concept uses the result of the first interpolation or the result of the second interpolation based on the vertical step edge area to perform vertical interpolation. In addition, an image processing device according to an embodiment of the inventive concept uses the result of the first interpolation or the result of the second interpolation based on the horizontal step edge area to perform horizontal interpolation.

In more detail, an image processing device according to an embodiment of the inventive concept calculates an interpolation value of the first interpolation and an interpolation value of the second interpolation as a vertical interpolation value of the image. In one case, an image processing device according to an embodiment of the inventive concept can use the first interpolation value as a final interpolation value. Alternatively, an image processing device according to an embodiment of the inventive concept can use the second interpolation value as a final interpolation value.

However, an interpolation according to an example is not limited to the case in which both the first interpolation value and the second interpolation value corresponding to the vertical direction are calculated. For example, an image processing device according to an embodiment of the inventive concept can use one of the first and second interpolation values based on the vertical step edge area as a final vertical interpolation value of the image.

When vertical interpolation is performed, an image processing device according to an embodiment of the inventive concept calculates the first interpolation value and the second interpolation value as a horizontal interpolation value of the image using the same image signal in which vertical interpolation is performed. In one case, an image processing device according to an embodiment of the inventive concept can use the first interpolation value as a final interpolation value. Alternatively, an image processing device according to an embodiment of the inventive concept can use the second interpolation value as a final interpolation value.

However, an interpolation according to an example is not limited to a case in which both the first interpolation value and the second interpolation value for the vertical direction are calculated. For example, an image processing device according to an embodiment of the inventive concept can use one of the first and second interpolation values based on the horizontal step edge area as a final horizontal interpolation value of the image.

An image processing device according to an embodiment of the inventive concept can selectively use the first interpolation value or the second interpolation value for each of the vertical image direction and the horizontal image direction as described above to interpolate the image in each of the vertical and horizontal directions.

In addition, even though the horizontal interpolation of the image is performed before the vertical interpolation of the image in the above-described detailed example of interpolation, the processing order of the vertical and horizontal directions can be switched.

(2-2) An Example of Interpolation: Interpolation by Combining the First Interpolation Value with the Second Interpolation Value an image processing device according to an embodiment of the inventive concept can calculate a first combination ratio based on the vertical step edge area. In addition, an image processing device according to an embodiment of the inventive concept can calculate a second combination ratio based on the horizontal step edge area.

Here, each of the first and second combination ratios according to an embodiment of the inventive concept is a value for combining the result of the first interpolation with the result of the second interpolation that is different from the first interpolation result. An example of a method of calculating the first and second combination ratios according to an embodiment of the inventive concept will be described with reference to an image processing device according to another embodiment of the inventive concept that will be described below.

An image processing device according to an embodiment of the inventive concept combines the first interpolation value with the second interpolation value according to the first combination ratio to perform vertical interpolation. In addition, an image processing device according to an embodiment of the inventive concept can combine the first interpolation value with the second interpolation based on the second combination ratio to perform horizontal interpolation.

In more detail, an image processing device according to an embodiment of the inventive concept calculates both of the first interpolation value and the second interpolation value as the vertical interpolation value of the image. An image processing device according to an embodiment of the inventive concept combines the first interpolation value with the second interpolation into the first combination ratio based on the vertical step edge area to generate a combined result as a final vertical interpolation value of the image.

When vertical interpolation is performed, an image processing device according to an embodiment of the inventive concept calculates both the first interpolation value and the second interpolation value as the horizontal interpolation value of the image by using the same image signal in which vertical interpolation is performed. An image processing device according to an embodiment of the inventive concept combines the first and second interpolation values into the second combination ratio based on the horizontal step edge area to generate a combined result as a final horizontal interpolation value of the image.

For example, an image processing device according to an embodiment of the inventive concept can selectively use the first interpolation value and the second interpolation value in each of the above-described vertical and horizontal directions of the image to interpolate the image in each of the vertical and horizontal directions.

In addition, even though the horizontal interpolation of the image is performed before the vertical interpolation of the image, in the above-described second detailed example of the interpolation, the processing order of the vertical and horizontal directions can be switched.

For example, an image processing device according to an embodiment of the inventive concept performs the vertical and horizontal step edge area determinations of section [2](1) and the interpolation of section [2](2) as a processing according to an image processing method according to an embodiment of the inventive concept.

Here, an image processing device according to an embodiment of the inventive concept performs interpolation of section [2](2), which corresponds to the vertical step edge area and the horizontal step edge area in vertical and horizontal step edge area determinations of section [2](1).

Thus, an image processing device according to an embodiment of the inventive concept performs interpolation that can reduce overshoot and ringing at a step edge and maintain high frequency components, such as a texture.

Since an interpolation that can reduce overshoot and ringing that occur on a step edge and maintain high frequency components, such as the texture, is realized, when an enhancement super resolution processing is performed, image quality may be effectively improved.

In addition, since a processing that can reduce jaggedness generated for an inclined interpolation is performed, texture components around the step edge may be maintained, and the jaggedness may be reduced.

Image Processing Device According to an Embodiment of the Inventive Concept

Hereinafter, an example of an image processing device according to an embodiment of the inventive concept that can perform a processing according to an above-described image processing method according to an embodiment of the inventive concept will be described.

[I] Image Processing Device According to an Embodiment

Figure 3:
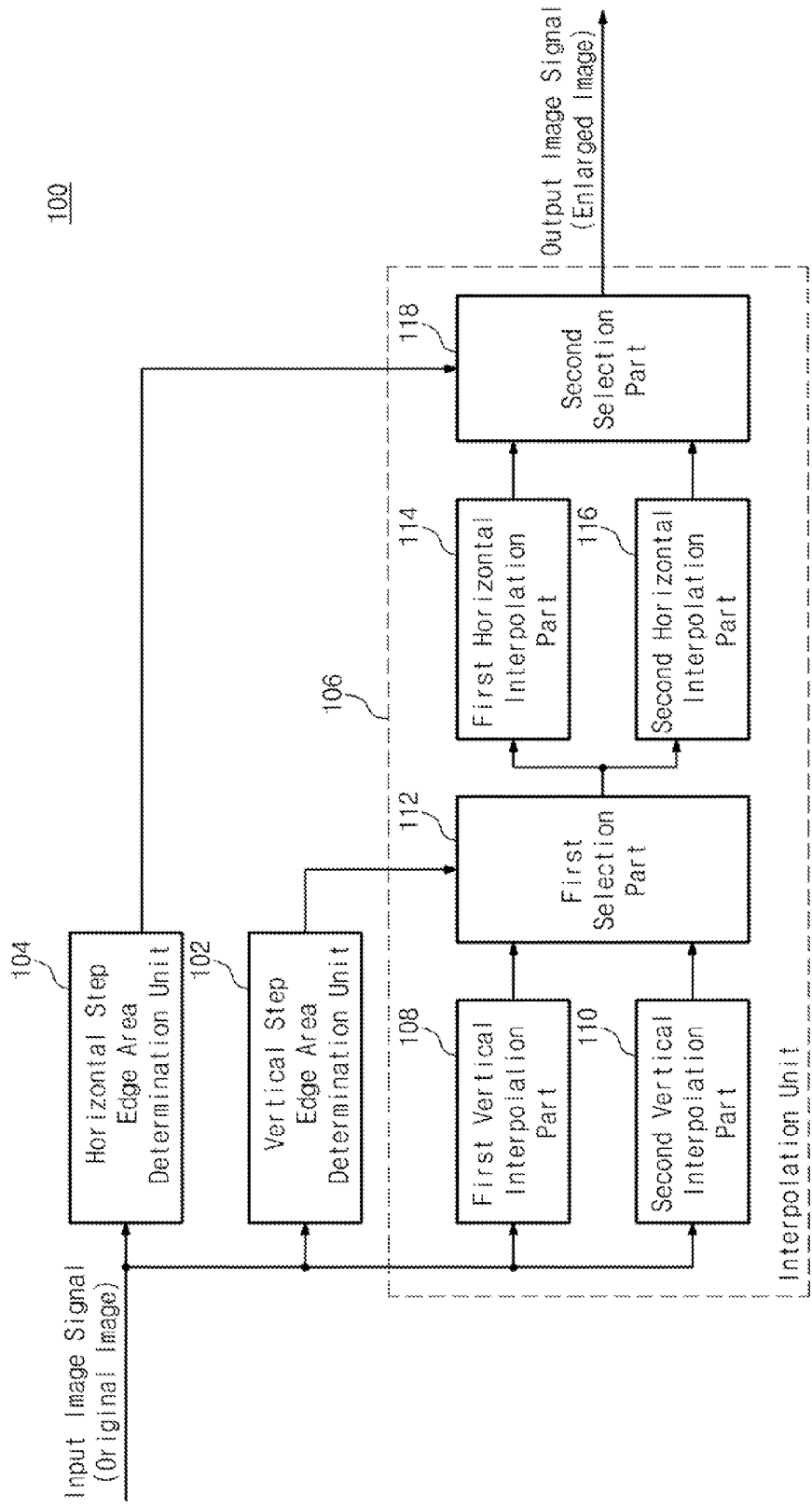
FIG. 3 is a block diagram of an example of an image processing device according to an embodiment.

FIG. 3 is a block diagram of an example of an image processing device 100 according to an embodiment, when the vertical interpolation of the image is performed before the horizontal interpolation of the image.

For example, according to an embodiment, the image processing device 100 includes a vertical step edge area determination unit 102, a horizontal step edge area determination unit 104, and an interpolation unit 106.

The image processing device 100 may include processors such as a central processing unit or other processing circuits and include a control unit that controls the entire image processing device 100. If the image processing device 100 includes a control unit, the control unit may act as the vertical step edge area determination unit 102, the horizontal step edge area determination unit 104, and the interpolation unit 106.

In addition, at least one of the vertical step edge area determination unit 102, the horizontal step edge area determination unit 104, and the interpolation unit 106 may be configured as a separate processing circuit, such as an application specific processing circuit or a general-purpose processing circuit, with respect to the control unit. Further, at least one of the vertical step edge area determination unit 102, the horizontal step edge area determination unit 104, and the interpolation unit 106 may be implemented as a software program executed by the processor.

The vertical step edge area determination unit 102 performs the vertical step edge area determination described in section [2](1) to determine the vertical step edge area from the input image signal. For example, the vertical step edge area determination unit 102 can determine the vertical step edge area from the relationship between the maximum value and the minimum value of a differential absolute value of an upper peripheral pixel and the relationship between the maximum value and the minimum value of a differential absolute value of a lower peripheral pixel.

Figure 4A:
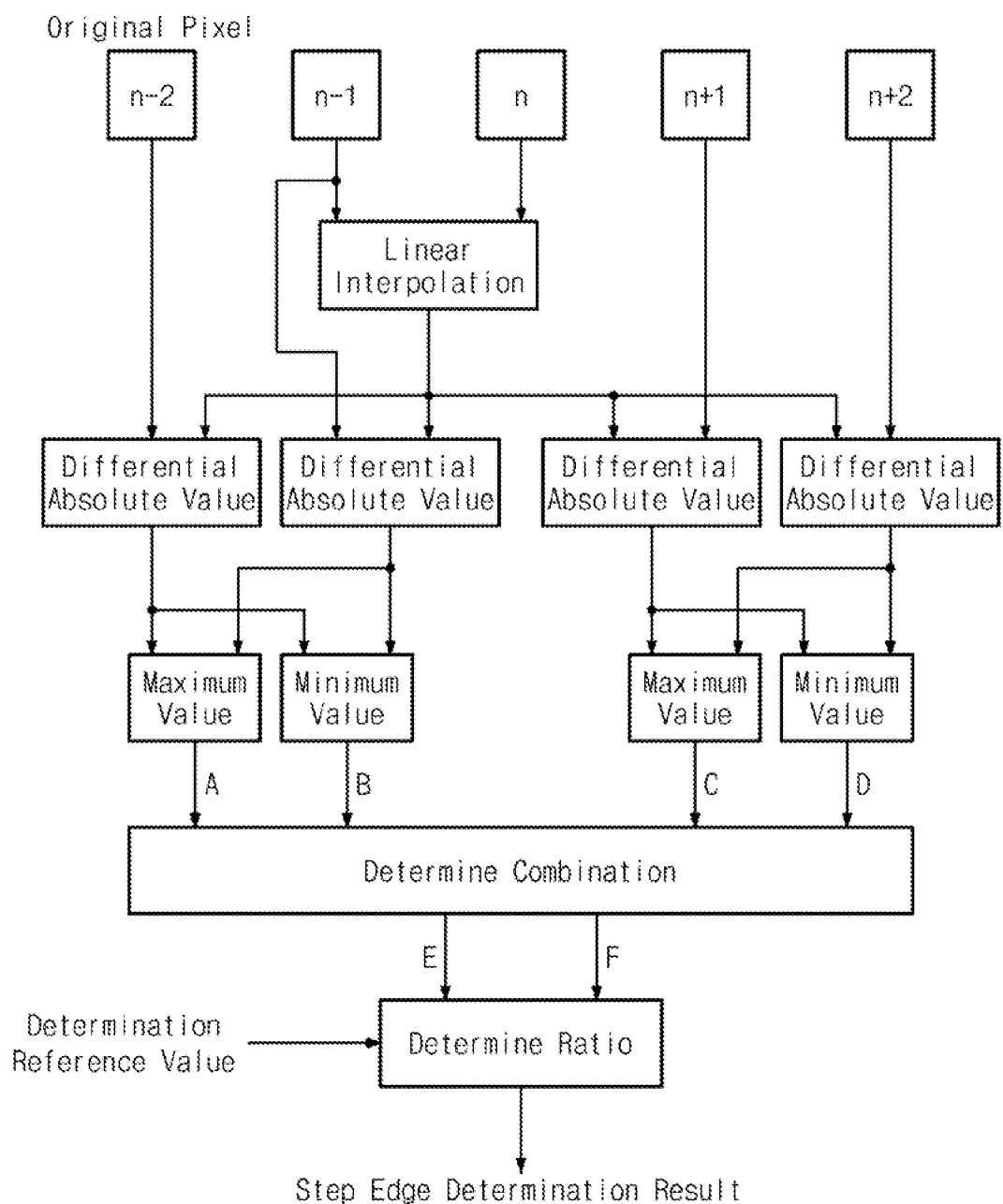
FIGS. 4A-B illustrate an example of a vertical step edge area determination unit included in an image processing device according to an embodiment.
Figure 4B:
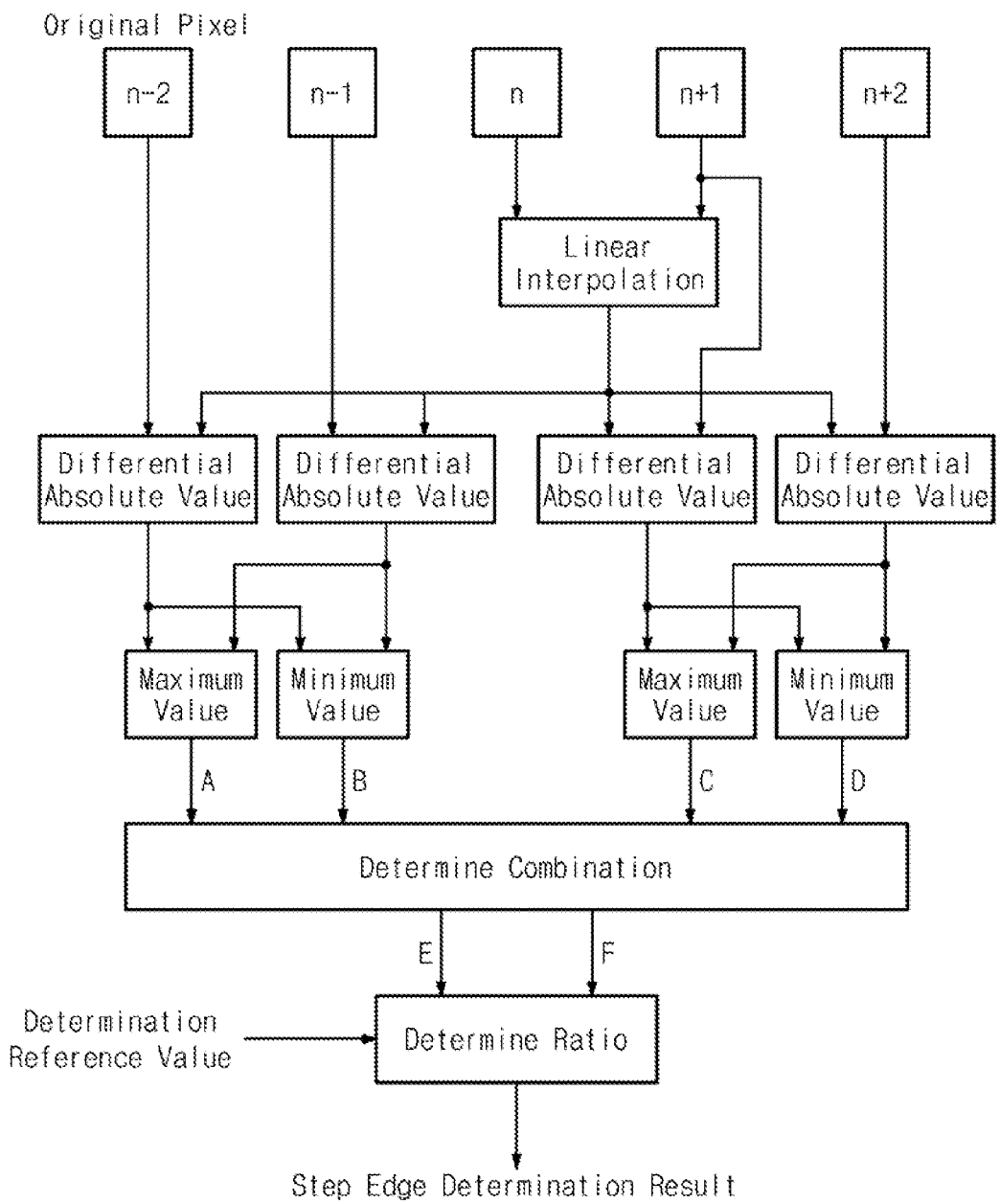

FIGS. 4A-B illustrates an example of a vertical step edge area determination unit 102 in the image processing device 100 according to an embodiment. FIG. 4A represents a case in which the interpolation position is disposed between pixel (nx, ny) and pixel (nx, ny−1) of FIG. 2. FIG. 4B represents a case in which the interpolation position is disposed between pixel (nx, ny) and pixel (nx, ny+1) of FIG. 2.

The Linear Interpolation block of FIGS. 4A-B represents a component that interpolates a value from the two sample values. Here, the linear interpolation coefficient is determined from the interpolation position. The Differential Absolute Value blocks of FIGS. 4A-B represent components that calculates a difference between two inputs to calculate the absolute value. The Maximum Value blocks of FIGS. 4A-B represent components that output a greater of two inputs. The Minimum Value blocks of FIGS. 4A-B represent components that output a lesser of two inputs.

Here, for the nth pixel, reference signs A and B represent the maximum value and the minimum value of the differential absolute value with respect to a negative-side pixel, respectively, and reference signs C and D represent the maximum value and the minimum value of the differential absolute value with respect to a positive-side pixel, respectively.

The Determine Combination block of FIGS. 4A-B represents a component that performs the output as below based on the relationships between values A and C.

If A>C, E=A, F=D are outputted.
If A<C, E=C, F=B are outputted.
If A=C, F=min(B, D) and E=A are outputted.

Here, E represents a size of the maximum edge around the (n)th sample, and F represents the flatness of an edge opposite to the maximum edge. For example, if E is relatively large, and F is close to zero, the edge is determined to be a step edge. Alternatively, if E is not relatively large, and F is not close to zero, it is determined that the edge is not a step edge.

The Determine Ratio block of FIGS. 4A-B represents a component that performs the above-described determination. For example, if E/F>α, the Determine Ratio block of FIGS. 4A-B determines that the edge is a step edge. Alternatively, if E>F·α, the Determine Ratio block determines that the edge is a step edge. In addition, as described above, the Determine Ratio block of FIGS. 4A-B further uses the above-described reference value to add to a condition of determination for a case in which F<E.

Referring again to FIG. 3, the horizontal step edge area determination unit 104 performs the horizontal step edge area determination of section [2](1) to determine the horizontal step edge area from the input image signal. For example, the horizontal step edge area determination unit 104 can determine the horizontal step edge area from relationship between the maximum value and the minimum value of the differential absolute value of a left peripheral pixel in the horizontal direction and the relationship between the maximum value and the minimum value of the differential absolute value of a right peripheral pixel in the horizontal direction.

For example, the horizontal step edge area determination unit 104 has the same structure as that of the vertical step edge area determination unit 102 of FIGS. 4A-B. In addition, the horizontal step edge area determination unit 104 performs the same processing to the image in the horizontal direction as that of the vertical step edge area determination unit 102 performs in the vertical direction to determine the horizontal step edge area.

The interpolation unit 106 performs an interpolation of the example described in section [2](2-1). Here, the interpolation unit 106 performs an interpolation corresponding to the vertical step edge area from the vertical step edge area determination unit 102 and the horizontal step edge area from the horizontal step edge area determination unit 104.

For example, the interpolation unit 106 includes a first vertical interpolation part 108, a second vertical interpolation part 110, a first selection part 112, a first horizontal interpolation part 114, a second horizontal interpolation part 116, and a second selection part 118. Here, the first and second vertical interpolation units 108 and 110 and the first selection part 112 perform the vertical interpolation of the image. In addition, the first and second horizontal interpolation units 114 and 116 and the second selection part 118 perform the horizontal interpolation of the image.

The first vertical interpolation part 108 performs a first interpolation, such as a linear interpolation with respect to the input image signal in the vertical direction of the image. When linear interpolation is performed, the first vertical interpolation part 108 processes the calculation shown in Equation 1 to perform the interpolation.

The second vertical interpolation part 110 performs a second interpolation, such as a Lanczos2, a Lanczos3, or a cubic interpolation, with respect to the input image signal in the vertical direction of the image.

In detail, if the interpolation is performed using a m-lobbed Lanczos filter, where m is an integer greater than 2, the second vertical interpolation part 110 processes the anti-aliasing filter using a function of Equation 4 below.

$$h(x, m) = \begin{cases} sinc(x) \cdot sinc(x/m), & |x| \le m \\ 0, & m < |x| \end{cases} \quad \text{[Equation 4]}$$

The coefficient of the Lanczos 3 filter is calculated from Equation 4. For example, when the interpolation position is ±0.25 from the (n)th sample, the coefficient of the antialiasing filter is obtained by calculating h(x, 3) with respect to 12 points of x={about −2.75, about −2.25, about −1.75, about −1.25, about −0.75, about −0.25, about 0.25, about 0.75, about 1.25, about 1.75, about 2.25, and about 2.75}.

Since the #0 polyphase filter is a coefficient with respect to the position −0.25, 6 points of x={about −2.75, about −1.75, about −0.75, about 0.25, about 1.25, and about 2.25} correspond to the (n−3)th sample to the (n+2)th sample, respectively. In addition, since the #1 polyphase filter is a coefficient with respect to the position 0.25, 6 points of x={about −2.25, about −1.25, about −0.25, about 0.75, about 1.75, and about 2.75} correspond to the (n−2)th sample to the (n+3)th sample, respectively. To maintain the DC component, the total sum of each of the coefficients is normalized to 1.

The first selection part 112 outputs one of the interpolation values received from the first vertical interpolation part 108 and received from the second vertical interpolation part 110 based on the vertical step edge area received from the vertical step edge area determination unit 102.

For example, if the first selection part 112 includes a switch, the vertical step edge area is represented by a high/low signal level. In this case, for example, the switch of the first selection part 112 can select the output based on the signal level to output one of the interpolation value received from the first vertical interpolation part 108 or the interpolation value received from the second vertical interpolation part 110. However, a configuration of the first selection part 112 or the vertical step edge area is not limited to the above-described examples.

The first horizontal interpolation part 114 performs a first interpolation. For example, the first horizontal interpolation part 114 performs linear interpolation with respect to the image signal in the horizontal direction of the image received from the first selection part 112. In addition, the second horizontal interpolation part 116 performs a second interpolation. For example, the second horizontal interpolation part 116 performs a Lanczos 2 filter, a Lanczos 3 filter, or a cubic interpolation with respect to the image signal in the horizontal direction of the image received from the first selection part 112.

The second selection part 118 outputs one of the interpolation values received from the first horizontal interpolation part 114 and received from the second horizontal interpolation part 116 based on the horizontal step edge area received from the horizontal step edge area determination unit 104.

For example, if the second selection part 118 includes a switch, the horizontal step edge area is represented by a high/low signal level. In this case, for example, the switch of the second selection part 118 can select the output by the switch based on the signal level to output one of the interpolation value received from the first horizontal interpolation part 114 or the interpolation value received from the second horizontal interpolation part 116. However, a configuration of the second selection part 118 or the horizontal step edge area is not limited to the above-described examples.

According to an embodiment, the interpolation unit 106 includes the components illustrated in FIG. 3 to perform the interpolation of an example described in section [2](2-1).

However, the components of the interpolation unit 106 according to an embodiment of the inventive concept are not limited thereto.

For example, the interpolation unit 106 may include the first vertical interpolation part 108, the second vertical interpolation part 110, and the first selection part 112 configured to receive output from the first horizontal interpolation part 114, the second horizontal interpolation part 116, and the second selection part 118. If the interpolation unit 106 has the above-described configuration, the image processing device 100 performs the interpolation by performing horizontal interpolation and then vertical interpolation.

In addition, for example, the interpolation unit 106 may not include the first selection part 112, and one of the first and second vertical interpolation parts 108 and 110 may interpolate based on the vertical step edge area received from the vertical step edge area determination unit 102. Similarly, for example, the interpolation unit 106 may not include the second selection part 118, and one of the first and second horizontal interpolation parts 114 and 116 may interpolate based on the horizontal step edge area received from the horizontal step edge area determination unit 104.

According to an embodiment of the inventive concept, the image processing device 100 performs a vertical step edge area determination, a horizontal step edge area determination, and an interpolation according to an example described in section [2](2-1) according to an image processing method according to an embodiment of the inventive concept using the components, including modified examples, of FIG. 3.

Thus, the image processing device 100 can perform an interpolation which reduces overshot and ringing from the step edge, and maintains high frequency components such as texture.

Also, since the image processing device 100 includes components of FIG. 3, including modified examples, for example, a line memory for image processing may be omitted.

[II] Image Processing Device According to Another Embodiment

Although an image processing device according to an embodiment performs the interpolation based on an example described in section [2](2-1), that is, the first and second interpolations are switched based on the step edge area, an image processing device according to a current embodiment of the inventive concept is not limited thereto that performs interpolation based on an example described in section [2](2-1).

For example, if the amplitude of the edge is small, overshoot and ringing are not visually recognized, and thus a result of the first interpolation and the result of the second interpolation can be combined with each other based on the amplitude of the edge.

Next, as an image processing device according to another embodiment, an image processing device that performs interpolation based on an example described in section [2](2-2) will be described.

Hereinafter, differences between an image processing device that performs interpolation based on an example described in section [2](2-2) and an image processing device that performs interpolation based on an example described in section [2](2-1) will be mainly described. In addition, a description of the same configurations as those of an image processing device that performs interpolation based on an example described in section [2](2-1) will be omitted.

Figure 5:
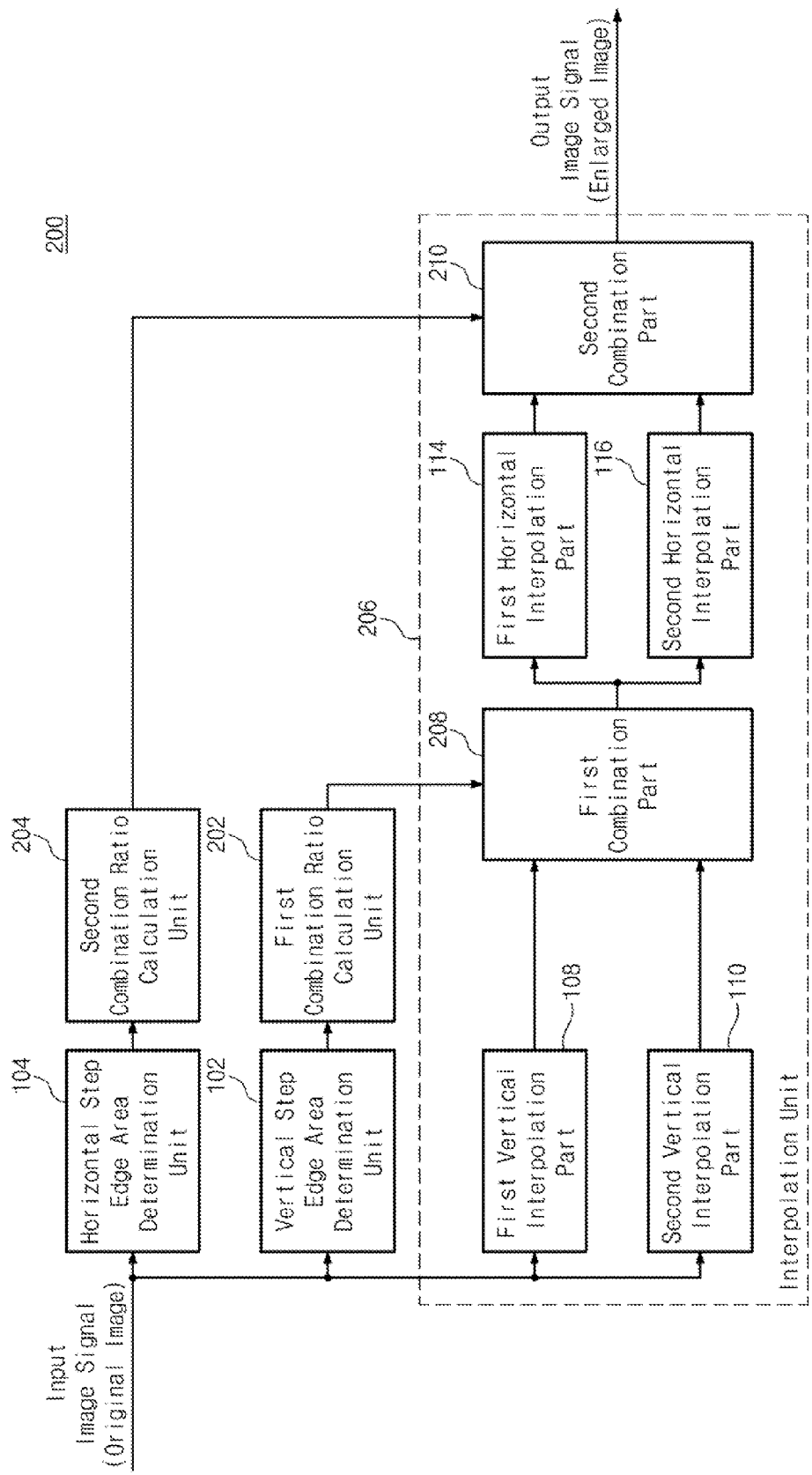
FIG. 5 is a block diagram of an example of an image processing device according to an embodiment.

FIG. 5 is a block diagram of an example of an image processing device 200 according to another embodiment of the inventive concept. FIG. 5 illustrates an example of an image processing device when vertical interpolation of the image is performed before horizontal interpolation, as illustrated in FIG. 3.

An image processing device 200 illustrated in FIG. 5 includes the vertical step edge area determination unit 102, the horizontal step edge area determination unit 104, a first combination ratio calculation unit 202, a second combination ratio calculation unit 204, and an interpolation unit 206.

The image processing device 200 may be configured with a processor such as a CPU or other processing circuits. The image processing device 200 may include a control unit for controlling the entire image processing device 200. If the image processing device 200 includes a control unit, the control unit may perform the functions of the vertical step edge area determination unit 102, the horizontal step edge area determination unit 104, the first combination ratio calculation unit 202, the second combination ratio calculation unit 204, and the interpolation unit 206.

Alternatively, at least one of the vertical step edge area determination unit 102, the horizontal step edge area determination unit 104, the first combination ratio calculation unit 202, the second combination ratio calculation unit 204, and the interpolation unit 206 may be implemented as a processing circuit, such as an application specific processing circuit, or a general-purpose processing circuit, separate from the control unit. Further, at least one of the vertical step edge area determination unit 102, the horizontal step edge area determination unit 104, the first combination ratio calculation unit 202, the second combination ratio calculation unit 204, and the interpolation unit 206 may be implemented as a software program executed by the processor.

The first combination ratio calculation unit 202 calculates a first combination ratio based on the vertical step edge area received from the vertical step edge area determination unit 102.

In more detail, for example, the first combination ratio calculation unit 202 can calculate the first combination ratio from the vertical step edge area and E, which is a size of the maximum edge around the target pixel, of FIG. 4.

Figure 6:
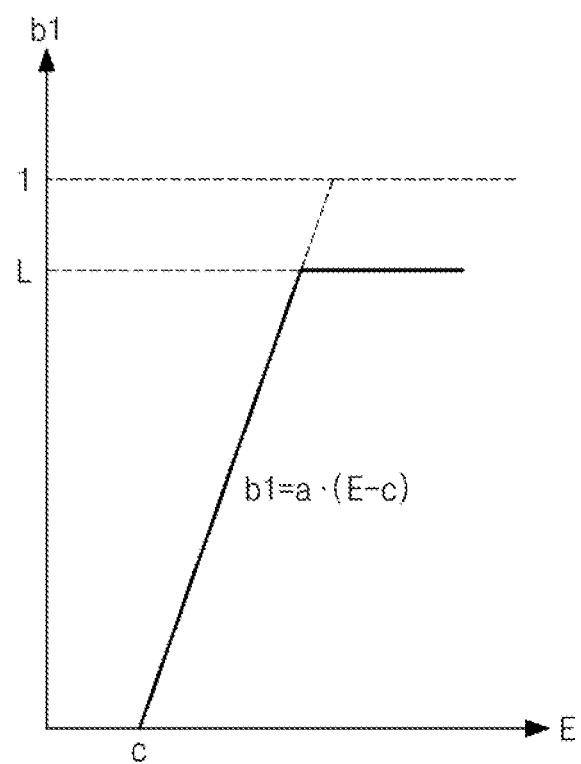
FIG. 6 illustrates an example of a first combination ratio calculation unit included in an image processing device according to an embodiment.

FIG. 6 illustrates an example of the first combination ratio calculation unit 202 in the image processing device 200 according to another embodiment.

A first interpolation ratio may be represented by b1, where $0 \le b1 \le 1$, and a second interpolation ratio may be represented by b2, where $b2 = 1 - b1$. Here, b1 and b2 are examples of a first combination ratio. That is, the first combination ratio can be calculated by determining one of b1 and b2.

As described above, if an area is not a vertical step edge area, a second interpolation is performed, and thus b1=0 and b2=1.

Also, if an area is a vertical step edge area, b1 is calculated by Equation 5 below.

$$b1 = \begin{cases} a \cdot (E - c), & E \ge c \\ 0, & E < c \end{cases} \qquad \text{[Equation 5]}$$

Here, a of Equation 5 is a value that adjusts the first combination ratio. For example, according to the value a, a step edge having a relatively small amplitude is smoothed, and overshoot and ringing may be reduced in a step edge having a relatively large amplitude. Here, for example, the value a may be experimentally obtained using a sample image. However, the value a is not limited thereto and may be determined by other methods.

Also, c of Equation 5 is a value that can prevent a texture area having a relatively small amplitude from being smoothed by the first interpolation. For example, the value c may be experimentally obtained by using a sample image. However, the value c is not limited thereto and may be set by other methods.

In addition, as illustrated in FIG. 6, for b1, for example, a limitation value L, where 0≤L≤1, may be set. Since the limitation value L is set, for example, overshoot and ringing may permitted in the image to improve a feeling of vividness. Here, for example, the limitation value L may be experimentally obtained by using a sample image. However, the limitation value L is not limited thereto and may be set by other methods.

The first combination ratio calculation unit 202 calculates the above-described first combination ratio.

However, a method for calculating the first combination ratio according to an embodiment of the inventive concept is not limited to the above-describe example. For example, the first combination ratio calculation unit 202 may calculate the first combination ratio without using the limitation value L. That is, the limitation value L may not be set.

Referring again to FIG. 5, an example of an image processing device 200 according to another embodiment will be described. The second combination ratio calculation unit 204 calculates a second combination ratio based on the horizontal step edge area received from the horizontal step edge area determination unit 104.

According to an embodiment, the second combination calculation unit 204 calculates the second combination ratio by the same method as that of the first combination ratio calculation unit 202.

The interpolation unit 206 performs an interpolation according to an example described in section [2](2-2). The interpolation unit 206 combines the first vertical interpolation value with the second vertical interpolation value with the first combination ratio received from the first combination ratio calculation unit 202 to perform vertical interpolation. In addition, the interpolation unit 206 combines the first horizontal interpolation value with the second horizontal interpolation value with the second combination ratio received from the second combination ratio calculation unit 204 to perform horizontal interpolation.

For example, the interpolation unit 206 includes a first vertical interpolation part 108, a second vertical interpolation part 110, a first combination part 208, a first horizontal interpolation part 114, a second horizontal interpolation part 116, and a second combination part 210. Here, in the interpolation unit 206, the first and second vertical interpolation units 108 and 110 and the first combination part 208 perform vertical interpolation of the image. In addition, in the interpolation unit 206, the first and second horizontal interpolation parts 114 and 116 and the second combination part 210 perform horizontal interpolation of the image.

There are differences between the interpolation unit 106 of FIG. 3 and the interpolation unit 206 in that the first combination part 208 combines the first vertical interpolation value with the second vertical interpolation value with the first combination ratio, and the second combination part 210 combines the first horizontal interpolation value with the second horizontal interpolation value according to the second combination ratio.

According to an embodiment, let the first combination ratio be represented by b1_1, and b2_1=1−b1_1, the first combination part 208 combines the first vertical interpolation value with the second vertical interpolation value at a ratio of b1_1:b2_1. Letting the second combination ratio be represented by b2_1 and b2_2=1−b1_2, the second combination part 210 combines the first horizontal interpolation value with the second horizontal interpolation value.

According to an embodiment, since the interpolation unit 206 includes the components of FIG. 5, the interpolation unit 206 performs an interpolation according to an example described in section [2](2-2).

However, components of the interpolation unit 206 according to another embodiment are not limited thereto.

According to an embodiment, the interpolation unit 206 may include the first vertical interpolation part 108, the second vertical interpolation part 110, and the first combination part 208 configured to receive output from the first horizontal interpolation part 114, the second horizontal interpolation part 116, and the second combination part 210. If the interpolation unit 206 includes the above-described configuration, the image processing device 200 performs the interpolation by performing horizontal interpolation and then vertical interpolation.

According to an embodiment, the image processing device 200 performs a vertical step edge area determination, a horizontal step edge area determination, and an interpolation according to an example described in section [2](2-2) according to an image processing method according to an embodiment of the inventive concept through the components, including modified examples, of FIG. 5.

Thus, the image processing device 200 according to another embodiment can perform an interpolation which reduces overshoot and ringing occurring from the step edge, and maintains high frequency components, such as texture.

In addition, since the image processing device 200 includes components of FIG. 5, including the modified examples, for example, a line memory for image processing may be omitted.

Although an image processing device according to an embodiment of the inventive concept has been exemplarily described, embodiments of the inventive concept are not limited thereto. For example, embodiments of the inventive concept may be applied to various devices that can process image signals, such as computers such as personal computers or servers, tablet type devices, or communication devices such as mobile phones or smart phones.

Program According to the Embodiment of the Inventive Concept

A program, such as a program that can allow a computer to act as a vertical step edge area determination unit 102, a horizontal step edge area determination unit 104, and an interpolation unit 106, or a program that can allow a computer to act as a vertical step edge area determination unit, a horizontal step edge area determination unit, a first combination ratio calculation unit 202, a first combination ratio calculation unit 204, and an interpolation unit 206 that allows a computer to act as an image processing device according to an embodiment of the inventive concept may be executed in the computer to perform the interpolation which reduces overshoot and ringing occurring from the step edge and maintains high frequency components, such as texture.

Also, a program that allows a computer to act as an image processing device according to embodiments of the inventive concept may be executed by the computer, and has a same effect as that of an image processing device.

In addition, although embodiments of the inventive concept have been described with reference to the accompanying drawings, embodiments of the inventive concept are not limited thereto. Various changes and modifications may be made thereto by one skilled in the art without departing from the scope and spirit of the exemplary embodiments as set forth in the appended claims. It is also understood that the terms used herein are merely descriptive, rather than limiting, and that various changes may be made without departing from the scope and spirit of exemplary embodiments of the disclosure.

For example, although a computer program that allows a computer to act as an image processing device according to an embodiment of the inventive concept is provided, embodiments of the inventive concept may also provide a recording medium in which a program is recorded.

According to the inventive concept, an image processing device can perform interpolation which reduces overshoot and ringing which occur on the step edge, but maintains high frequency components, such as texture.

The above-disclosed subject matter is to be considered illustrative and not restrictive, and the appended claims are intended to cover all such modifications, enhancements, and other embodiments, which fall within the true spirit and scope of the embodiments of the inventive concept. Thus, to the maximum extent allowed by law, the scope of the embodiments of the inventive concept is to be determined by the broadest permissible interpretation of the following claims and their equivalents, and shall not be restricted or limited by the foregoing detailed description.

What is claimed is:

1. An image processing device comprising:
    a vertical step edge area determination unit that determines a vertical step edge area of an image;
    a horizontal step edge area determination unit that determines a horizontal step edge area of the image; and
    an interpolation unit that performs an interpolation on the vertical step edge area and the horizontal step edge area,
    wherein the vertical step edge area determination unit calculates an absolute value of a difference between a vertical interpolation value of a target pixel and a value of a pixel vertically adjacent to the target pixel and determines the vertical step edge area based on a relationship between a maximum value and a minimum value of the absolute value of an upper peripheral pixel with respect to the target pixel and the maximum value and the minimum value of the absolute value of a lower peripheral pixel with respect to the target pixel.

2. The image processing device of claim 1, wherein the horizontal step edge area determination unit calculates an absolute value of a difference between a horizontal interpolation value of a target pixel and a value of a pixel horizontally adjacent to the target pixel and determines the horizontal step edge area based on a relationship between the maximum value and the minimum value of the absolute value of a left peripheral pixel with respect to the target pixel and the maximum value and the minimum value of the absolute value of a right peripheral pixel with respect to the target pixel.

3. The image processing device of claim 1, wherein the interpolation unit performs a vertical interpolation using a result of a first interpolation in which overshoot and ringing do not occur or a result of a second interpolation different from the first interpolation based on the vertical step edge area, and
    performs a horizontal interpolation using the result of the first interpolation or the result of the second interpolation based on the horizontal step edge area.

4. The image processing device of claim 1, further comprising:
    a first combination part that calculates a first combination ratio that combines a result of a first vertical interpolation in which overshoot and ringing do not occur with a result of a second interpolation different from the first vertical interpolation based on the vertical step edge area; and
    a second combination part that calculates a second combination ratio that combines a result of a first horizontal interpolation with a result of the second interpolation based on the horizontal step edge area,
    wherein the interpolation unit combines the result of the first vertical interpolation with the result of the second interpolation on the basis of the first combination ratio to perform vertical interpolation, and combines the result of the first horizontal interpolation with the result of the second interpolation on the basis of the second combination ratio to perform horizontal interpolation.

5. The image processing device of claim 3, wherein the vertical step edge area determination unit calculates a vertical interpolation value of the target pixel by the first vertical interpolation in which overshoot and ringing do not occur.

6. The image processing device of claim 3, wherein the horizontal step edge area determination unit calculates a horizontal interpolation value of the target pixel by the first horizontal interpolation in which overshoot and ringing do not occur.

7. An image processing method comprising:
    determining a vertical step edge area of an image;
    determining a horizontal step edge area of the image; and
    performing an interpolation based on the vertical step edge area and the horizontal step edge area,
    wherein determining the vertical step edge area includes calculating an absolute value of a difference between a vertical interpolation value of a target pixel and a value of a pixel vertically adjacent to the target pixel, and determining the vertical step edge area based on a relationship between a maximum value and a minimum value of the absolute value of an upper peripheral pixel with respect to the target pixel and the maximum value and the minimum value of the absolute value of a lower peripheral pixel with respect to the target pixel.

8. The image processing method of claim 7, wherein determining the horizontal step edge area includes calculating an absolute value of a difference between a horizontal interpolation value of a target pixel and a value of a pixel horizontally adjacent to the target pixel, and determining the horizontal step edge area based on a relationship between the maximum value and the minimum value of the absolute value of a left peripheral pixel with respect to the target pixel and the maximum value and the minimum value of the absolute value of a right peripheral pixel with respect to the target pixel.

9. The image processing method of claim 7, further comprising:
    performing a vertical interpolation using a result of a first interpolation in which overshoot and ringing do not occur or a result of a second interpolation different from the first interpolation processing based on the vertical step edge area, and
    performing a horizontal interpolation using the result of the first interpolation or the result of the second interpolation based on the horizontal step edge area.

10. The image processing method of claim 7, further comprising:
    calculating a first combination ratio that combines a result of a first vertical interpolation in which overshoot and ringing do not occur with a result of a second interpolation different from the first interpolation based on the vertical step edge area; and calculating a second combination ratio that combines a result of the first horizontal interpolation with a result of the second interpolation based on the horizontal step edge area, wherein the result of the first vertical interpolation is combined with the result of the second interpolation on the basis of the first combination ratio to perform vertical interpolation, and the result of the first horizontal interpolation is combined with the result of the second interpolation on the basis of the second combination ratio to perform horizontal interpolation.

11. The image processing method of claim 9, wherein determining the vertical step edge area includes calculating a vertical interpolation value of the target pixel by the first interpolation in which overshoot and ringing do not occur.

12. The image processing method of claim 9, wherein determining the horizontal step edge area includes calculating a horizontal interpolation value of the target pixel by the first interpolation in which overshoot and ringing do not occur.

13. An image processing device comprising:
a vertical step edge area determination unit that determines a vertical step edge area of an image;
a horizontal step edge area determination unit that determines a horizontal step edge area of the image; and
an interpolation unit that performs an interpolation on a the vertical step edge area and the horizontal step edge area,
wherein the horizontal step edge area determination unit calculates an absolute value of a difference between a horizontal interpolation value of a target pixel and a value of a pixel horizontally adjacent to the target pixel and determines the horizontal step edge area based on a relationship between the maximum value and the minimum value of the absolute value of a left peripheral pixel with respect to the target pixel and the maximum value and the minimum value of the absolute value of a right peripheral pixel with respect to the target pixel.

14. The image processing device of claim 13, wherein the interpolation unit performs a vertical interpolation using a result of a first interpolation in which overshoot and ringing do not occur or a result of a second interpolation different from the first interpolation based on the vertical step edge area, and performs a horizontal interpolation using the result of the first interpolation or the result of the second interpolation based on the horizontal step edge area.

15. The image processing device of claim 13, wherein the vertical step edge area determination unit calculates an absolute value of a difference between a vertical interpolation value of a target pixel and a value of a pixel vertically adjacent to the target pixel and determines the vertical step edge area based on a relationship between a maximum value and a minimum value of the absolute value of an upper peripheral pixel with respect to the target pixel and the maximum value and the minimum value of the absolute value of a lower peripheral pixel with respect to the target pixel.

16. The image processing device of claim 13, further comprising:
a first combination part that calculates a first combination ratio that combines a result of a first vertical interpolation in which overshoot and ringing do not occur with a result of a second interpolation different from the first interpolation based on the vertical step edge area; and
a second combination part that calculates a second combination ratio that combines a result of the first horizontal interpolation with a result of the second interpolation based on the horizontal step edge area,
wherein the interpolation unit combines the result of the first vertical interpolation with the result of the second interpolation on the basis of the first combination ratio to perform vertical interpolation, and combines the result of the first horizontal interpolation with the result of the second interpolation on the basis of the second combination ratio to perform horizontal interpolation.

17. The image processing device of claim 14, wherein the vertical step edge area determination unit calculates a vertical interpolation value of the target pixel by the first vertical interpolation in which overshoot and ringing do not occur.

18. The image processing device of claim 14, wherein the horizontal step edge area determination unit calculates a horizontal interpolation value of the target pixel by the first horizontal interpolation in which overshoot and ringing do not occur.

* * * * *